(12) United States Patent
Kim

(10) Patent No.: US 10,044,684 B2
(45) Date of Patent: Aug. 7, 2018

(54) SERVER FOR AUTHENTICATING SMART CHIP AND METHOD THEREOF

(71) Applicant: Deoksang Kim, Seoul (KR)

(72) Inventor: Deoksang Kim, Seoul (KR)

( * ) Notice: Subject to any disclaimer, the term of this patent is extended or adjusted under 35 U.S.C. 154(b) by 239 days.

(21) Appl. No.: 15/021,221

(22) PCT Filed: Sep. 5, 2014

(86) PCT No.: PCT/KR2014/008380
§ 371 (c)(1),
(2) Date: Mar. 10, 2016

(87) PCT Pub. No.: WO2015/037887
PCT Pub. Date: Mar. 19, 2015

(65) Prior Publication Data
US 2016/0226837 A1    Aug. 4, 2016

(30) Foreign Application Priority Data

Sep. 11, 2013 (KR) .................. 10-2013-0108779
Sep. 11, 2013 (KR) .................. 10-2013-0108780
Sep. 11, 2013 (KR) .................. 10-2013-0108781
Mar. 13, 2014 (KR) .................. 10-2014-0029894

(51) Int. Cl.
  *H04L 29/06* (2006.01)
  *H04L 9/32* (2006.01)
  *H04W 12/06* (2009.01)

(52) U.S. Cl.
CPC ........ *H04L 63/0428* (2013.01); *H04L 9/3234* (2013.01); *H04L 9/3271* (2013.01); *H04L 63/0853* (2013.01); *H04W 12/06* (2013.01); *H04L 2209/56* (2013.01); *H04L 2463/061* (2013.01)

(58) Field of Classification Search
CPC ................................................... H04L 63/0428
USPC .......................................................... 713/168
See application file for complete search history.

(56) References Cited

U.S. PATENT DOCUMENTS

2005/0120216 A1    6/2005 Lee et al.

FOREIGN PATENT DOCUMENTS

| KR | 10-2002-0003717 A | 1/2002 |
| KR | 10-2005-0079951 A | 8/2005 |
| KR | 10-2009-0092455 A | 9/2009 |
| KR |     2010-0006004 A | 1/2010 |
| KR | 10-2010-0074698 A | 7/2010 |

*Primary Examiner* — Jacob Lipman
(74) *Attorney, Agent, or Firm* — Novick, Kim & Lee, PLLC; Sang Ho Lee

(57) ABSTRACT

The present invention provides a server for authenticating a smart chip, which is connected to a terminal transmitting and receiving data to and from the smart chip through a network, the server including: a server transceiving unit receiving a card identifier identifying a user from the terminal; and an authentication unit generating an authentication key from the card identifier and authenticating the smart chip from the authentication key, in which the smart chip receives the encrypted text to generate the decrypted text from a private key, and the card identifier is a public key corresponding to the private key. Accordingly, the present invention has the advantages of increasing the safety of a transaction to confirm whether a user has a medium in possession during online and offline transactions.

20 Claims, 11 Drawing Sheets

| Transmission data from terminal to server | | | Server authentication | | |
|---|---|---|---|---|---|
| Encrypted text (C) | Decrypted text (S) | Card identifier | Authentication key (u) | Random number (M) after decoding | Result |
| $M_1^{e1}$ | $M_1^{e1*s1}$ | $ID_1$ | $u_1 = H(ID_1)$ | $M_1^{e1*(s1+u1)}$ | $M_1 \to ID_1$ |
|  |  | $ID_2$ | $u_2 = H(ID_2)$ | $M_1^{e1*(s1+u2)}$ | ? |
| $M_1^{e2}$ | $M_1^{e1*s1}$ | $ID_1$ | $u_1 = H(ID_1)$ | $M_1^{e2*(s1+u1)}$ | ? |
|  |  | $ID_2$ | $u_2 = H(ID_2)$ | $M_1^{e2*(s1+u2)}$ | ? |
| $M_2^{e1}$ | $M_2^{e1*s1}$ | $ID_1$ | $u_1 = H(ID_1)$ | $M_2^{e1*(s1+u1)}$ | $M_2 \to ID_2$ |
|  |  | $ID_2$ | $u_2 = H(ID_2)$ | $M_2^{e1*(s1+u2)}$ | ? |
| $M_2^{e2}$ | $M_2^{e1*s1}$ | $ID_1$ | $u_1 = H(ID_1)$ | $M_2^{e2*(s1+u1)}$ | ? |
|  |  | $ID_2$ | $u_2 = H(ID_2)$ | $M_2^{e2*(s1+u2)}$ | ? |

FIG. 10

SERVER FOR AUTHENTICATING SMART CHIP AND METHOD THEREOF

TECHNICAL FIELD

The present invention relates to a server for authenticating a smart chip and a method thereof, and more particularly, to a server for authenticating a smart chip which performs authentication for the smart chip by using only authentication data including a card identifier and a common factor which are exposed outside.

BACKGROUND ART

Recently, due to rapid development of information communication techniques and the spread of information communication network, electronic transaction such as internet shopping, banking services, or electronic commerce and electronic payments between companies has been actively in progress. The non-faced credit transaction uses the network communication. Since it is difficult for parties to the transaction to verify identification of the parties to the transaction and determine and verify the authenticity of the transactions, the non-faced credit is most likely to include various problems including denying the transaction fact and the like.

As a result, a method for authenticating memberships by using a certificate has been widely used, and the certificate is a digital certificate which is issued from a certificate authority to be hold in the member and includes an owner's name, a serial number, an owner's public key copy, a digital signature of the certificate issuing authority, and the like.

The certificate has a public key infrastructure (PKI) applying an asymmetric cryptography method in which encryption and decryption are possible by using a pair of a public key and a private or secret key which correspond to each other.

In addition, in the electronic payment, since the authentication is received by an authentication request with the electronic signature in which encryption and decryption are possible by the certificate authority and a fixed rule of hashing algorithm using the pair of the public key and the private key which correspond to each other, in this process, the possibility of the third part's intervention is extremely low and thus, safe no-facing transaction is possible.

However, when the electronic transaction is performed with the credit card using the certificate, if a password of the certificate and a card number of the credit card are known, actually, there is a problem in that even the transaction part without holding the card may perform the electronic transaction. Accordingly, when the on/off-line transaction is performed by using the credit card, a transaction service requiring verification of whether a user holds a medium (credit card) is required. With regard to the present invention, Korea Patent publication No. 2010-0006004 (authentication process method and system, and card terminal for authentication process using card) is present.

DESCRIPTION OF INVENTION

Technical Problem

The present invention has been made in an effort to provide a server for authenticating a smart chip and a method thereof that performs verification by only initial data generated from a smart card (chip) and a terminal.

Further, the present invention has been made in an effort to provide a server for authenticating a smart chip and a method thereof so as to verify whether a smart card (chip) is held by using only public data.

Technical Solution

An exemplary embodiment of the present invention provides a server for authenticating a smart chip, which is connected to a terminal transmitting and receiving data to and from the smart chip through a network, the server including: a server transceiving unit configured to receive a card identifier identifying a user, an encrypted text, and a decrypted text from the terminal; and an authentication unit configured to generate an authentication key from the card identifier and determine whether the decrypted text is generated from the received card identifier by using authentication key as a medium to authenticate the smart chip, in which the terminal encrypts the card identifier to generate the encrypted text, the smart chip receives the encrypted text to generate the decrypted text from a private key and transmits the decrypted text to the terminal, and the card identifier is a public key corresponding to the private key.

Preferably, the card identifier has a form which is opened and recognized outside.

Preferably, the server for authenticating the smart chip further includes a server storage unit configured to store a common factor, in which the authentication is performed by generating a decryption factor based on the common factor and the authentication key.

Preferably, the authentication is performed by generating a random number based on the decryption factor and the common factor.

Preferably, the authentication is performed by decrypting the random number.

Preferably, the authentication is performed by determining whether the card identifier coincides with a decryption value of the random number.

Preferably, the smart chip is authenticated to be valid when the card identifier coincides with the decryption value of the random number.

Preferably, the server transceiving unit transmits authentication information on the authenticated smart chip to the terminal.

Another exemplary embodiment of the present invention provides a smart chip which transmits and receives data to and from a terminal connected to a server through a network, the smart chip including: a smart chip storage unit configured to store a card identifier identifying a user and a private key; a decryption unit configured to decrypt a encrypted text generated and received in the terminal with the private key to generate a decrypted text; and a smart chip transceiving unit configured to transmit the card identifier and the decrypted text to the terminal and receive the encrypted text from the terminal, in which the terminal encrypts the card identifier to generate the encrypted text, the server receives the card identifier, the encrypted text, and the decrypted text from the terminal, generates an authentication key from the card identifier, and authenticates the smart chip by determining whether the decrypted text is generated from the received card identifier by using the authentication key as a medium, and the card identifier is a public key corresponding to the private key.

Yet another exemplary embodiment of the present invention provides a terminal for authenticating a smart chip, which transmits and receives data to and from the smart chip and is connected to a server through a network, the terminal including: a terminal transceiving unit configured to receive a card identifier and a decrypted text from the smart chip;

and a encryption unit configured to encrypt the card identifier to generate the encrypted text, in which the terminal transceiving unit transmits the card identifier, the encrypted text, and the decrypted text to the server, the server receives the card identifier, the encrypted text, and the decrypted text from the terminal, generates an authentication key from the card identifier, and determines whether the decrypted text is generated from the received card identifier by using the authentication key as a medium, and the smart chip generates the decrypted text from a private key by receiving the encrypted text, and the card identifier is a public key corresponding to the private key.

Still another exemplary embodiment of the present invention provides a terminal for authenticating a smart chip, which transmits and receives data to and from the smart chip and is connected to a server through a network, the terminal including: an input unit configured to receive a card identifier; a encryption unit configured to encrypt the card identifier to generate a encrypted text; a terminal transceiving unit configured to transmit the card identifier to the server and receive authentication information on the smart chip from the server when the server authenticates the smart chip by using the card identifier, in which the server receives the card identifier, the encrypted text, and the decrypted text from the terminal, generates an authentication key from the card identifier, and determines whether the decrypted text is generated from the received card identifier by using the authentication key as a medium, and the smart chip generates the decrypted text from a private key by receiving the encrypted text, and the card identifier is a public key corresponding to the private key.

Still yet another exemplary embodiment of the present invention provides a method for authenticating a smart chip in which a server transmitting and receiving data to and from the smart chip and connected to a terminal through a network authenticates the smart chip, the method including: receiving a card identifier identifying a user, a encrypted text, and a decrypted text from the terminal; generating an authentication key from the card identifier; and authenticating the smart chip from the authentication key, in which the server determines whether the decrypted text is generated from the received card identifier by using the authentication key as a medium, the terminal encrypts the card identifier to generate the encrypted text, the smart chip receives the encrypted text to generate the decrypted text from a private key and transmits the decrypted text to the terminal, and the card identifier is a public key corresponding to the private key.

Still yet another exemplary embodiment of the present invention provides a method for authenticating a smart chip which transmits and receives data to and from a terminal connected to a server through a network, the method including: storing a card identifier identifying a user and a private key; receiving a generated encrypted text from the terminal; generating a decrypted text by decrypting the encrypted text to the private key; and transmitting the decrypted text to the terminal, in which the terminal encrypts the card identifier to generate the encrypted text, and the card identifier is a public key corresponding to the private key.

Still another exemplary embodiment of the present invention provides a method for authenticating a smart chip in which a terminal transmitting and receiving data to and from the smart chip and connected to a server through a network authenticates the smart chip, the method including: receiving a card identifier from the smart chip; encrypting the card identifier to generate a encrypted text; transmitting the card identifier to the server; and receiving authentication information on the smart chip from the server when the server authenticates the smart chip by using the card identifier, in which the server receives the card identifier, the encrypted text, and the decrypted text from the terminal, generates an authentication key from the card identifier, and determines whether the decrypted text is generated from the received card identifier by using the authentication key as a medium, and the smart chip generates the decrypted text from a private key by receiving the encrypted text, and the card identifier is a public key corresponding to the private key.

Still another exemplary embodiment of the present invention provides a method for authenticating a smart chip in which a terminal transmitting and receiving data to and from the smart chip and connected to a server through a network authenticates the smart chip, the method including: receiving a card identifier; encrypting the card identifier to generate a encrypted text; transmitting the card identifier to the server; and receiving authentication information on the smart chip from the server when the server authenticates the smart chip by using the card identifier, in which the server receives the card identifier, the encrypted text, and the decrypted text from the terminal, generates an authentication key from the card identifier, and determines whether the decrypted text is generated from the received card identifier by using the authentication key as a medium, and the smart chip generates the decrypted text from a private key by receiving the encrypted text, and the card identifier is a public key corresponding to the private key.

Advantageous Effects

The present invention has the advantages of increasing the safety of a transaction to confirm whether a user has a medium in possession during online and offline transactions.

Further, the present invention has the advantages of preventing personal information including a smart card from being leaked by performing the authentication by using only public data.

BRIEF DESCRIPTION OF DRAWINGS

FIG. 10 is a view illustrating an exemplary diagram of a table verifying an authentication method according to the exemplary embodiment of the present invention.

MODES FOR CARRYING OUT THE INVENTION

Figure 1:
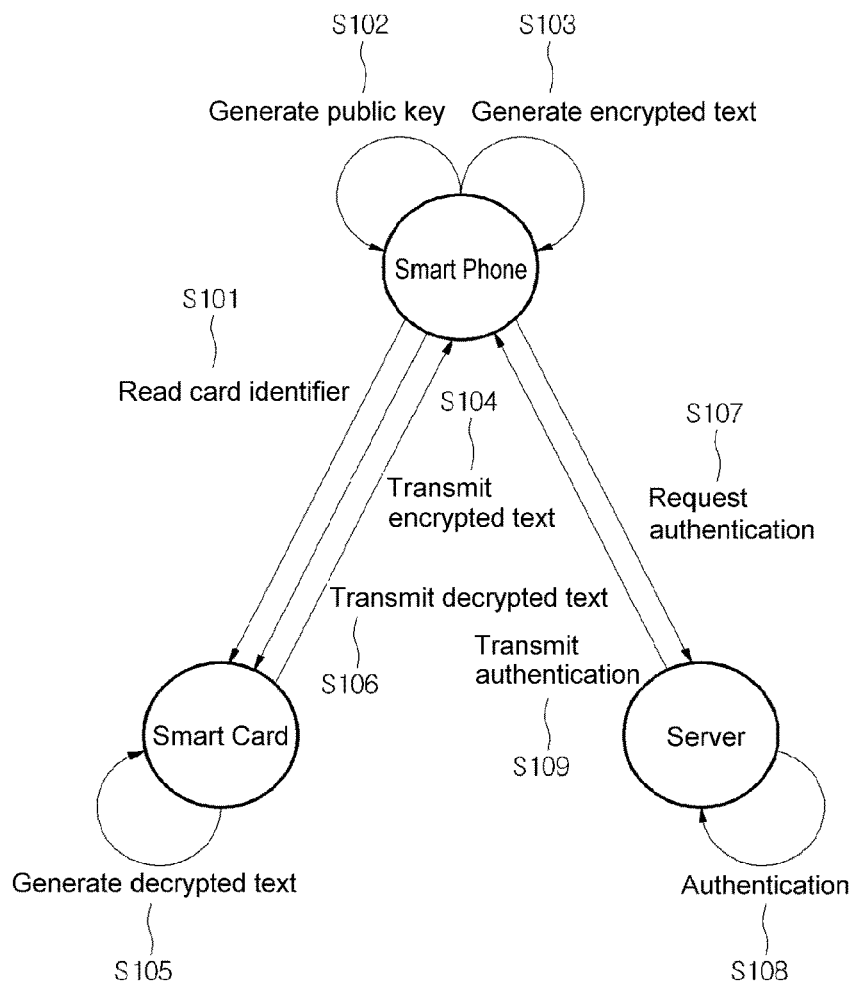
FIG. 1 is a view illustrating a schematic diagram of smart chip authentication according to an exemplary embodiment of the present invention.

Various advantages and features of the present disclosure and methods accomplishing thereof will become apparent from the following description of exemplary embodiments with reference to the accompanying drawings. However, the present invention is not limited to exemplary embodiment disclosed herein but will be implemented in various forms. The exemplary embodiments are provided by way of example only so that a person of ordinary skilled in the art can fully understand the disclosures of the present invention and the scope of the present invention. Therefore, the present invention will be defined only by the scope of the appended claims. Meanwhile, terms used in the present invention are to explain exemplary embodiments rather than limiting the present invention. Further, the detailed description of known functions and configurations which can unnecessarily obscure the gist of the present invention will be omitted. In describing the present invention, in order to facilitate the overall understanding, like means will use like reference numerals regardless of drawing numerals.

FIG. 1 is a view illustrating a schematic diagram of smart chip authentication according to an exemplary embodiment of the present invention.

Referring to FIG. 1, smart chip authentication according to the present invention is constituted by including a terminal 220 represented by a smart phone, a smart card including a smart chip 220, and a server 230 authenticating the smart chip 220.

A user for the smart phone performs the on/off-line transaction by using the smart card, the authentication process is schematically illustrated. The smart phone reads a smart card identification ID on the smart card to perform the payment (S101). The smart phone has the smart card identification ID and generates a public key (S102). The smart phone has the smart card identification ID, generates a random number, and generates an encrypted text by using the random number and the public key (S103). The smart phone transmits the encrypted text to the smart card (S104). The smart card generates a decrypted text by decrypting the encrypted text (S105). The smart card transmits the decrypted text to the smart phone (S106). The smart phone includes the encrypted text, the decrypted text, and the smart card identification ID to request the authentication for the smart card to the server (S107). The server performs the authentication for the smart card (S108). The server transmits whether the authentication for the authentication request is present to the smart phone (S109).

The smart chip authentication of the present invention includes the server performing the authentication for the smart phone including the smart chip, and may identify basic data stored in the smart chip and the smart chip, has only safe data even if being leaked, and performs the authentication. As a result, the smart chip authentication has an effect of performing only a simple authentication process.

Figure 2:
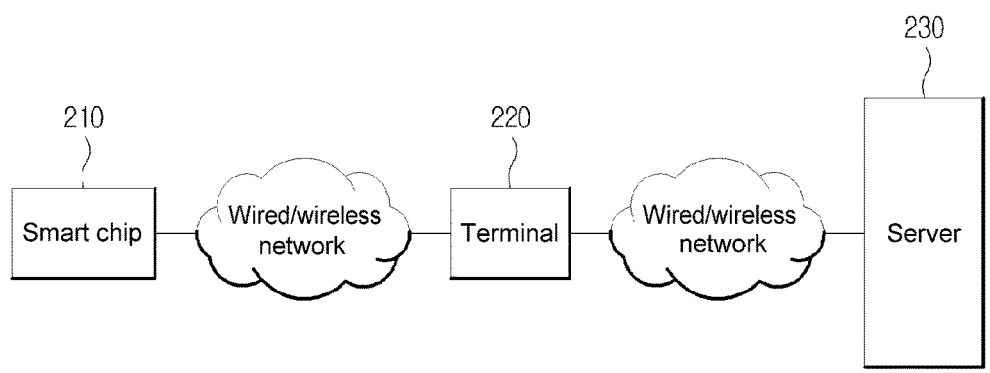
FIG. 2 is a view illustrating a block diagram of a system of authenticating a smart chip according to the exemplary embodiment of the present invention.

FIG. 2 is a view illustrating a block diagram of a system of authenticating a smart chip according to the exemplary embodiment of the present invention.

Referring to FIG. 2, a system 200 for authenticating the smart chip includes a smart chip 210, a terminal 220, and a server 230. The smart chip 210 and the terminal 220 are connected to each other via the network, and the terminal 220 and the server 230 are connected to each other via the network. The smart phone 210 data-communicates with the terminal 220, the server 230 data-communicates with the terminal 220, and the terminal 220 data-communicates with the smart phone 210 and the server 230.

The network is a concept including both a wired communication network and a wireless communication network, but is not limited thereto, and may be other communication networks capable of transmitting and receiving the data. The wireless communication network includes all types of communication networks using a radio wave and includes a short-range communication network, a mobile communication network, a broadband communication network, or the like. Preferably, the network between the smart chip 210 and the terminal 220 may be a short-range communication network such as near field communication (NFC), and the network between the terminal 220 and the server 230 may be a mobile communication network such as long term evolution (LTE).

The smart chip 210 stores a common factor n, an individual factor s, and a card identifier. The smart chip 210 generates the decrypted text by using the encrypted text generated by using the card identifier, transmits the decrypted text to the terminal 220, and receives authentication information for the smart chip 210 from the terminal 220 or the server 230 when the smart chip 210 is authenticated by using the authentication key generated from authentication data including the card identifier.

The common factor n as a factor which is commonly used in all smart phones is an element which is stored in the terminal 220 and the server 230 as well as the smart phone 210 and used in the encrypting, decrypting, and authenticating processes. The individual factor s as a factor which is uniquely used in each smart card is an element which is stored only in the smart chip 210 and used when the smart phone 210 decrypts the encrypted text. The card identifier ID as a factor including information capable of identifying each smart card user is stored only in the smart chip 210. The card identifier ID is an element used when the terminal 220 generates the encrypted text and the server 230 performs the authentication.

The card identifier ID may be a form capable of being recognized by the user outside the smart chip or the smart card, not inside the smart chip or the smart card. That is, the card identifier ID may be opened to the outside. The card identifier ID is formed by modifying a card identification number CIN or may be the card identification number CIN itself. The process of generating the card identifier ID from the card identification number CIN will be described below with reference to FIG. 6.

When the card identifier ID is formed by the modified card identification number CIN, the card identifier ID may be any serial number. The same card identifier ID as the card identification number CIN may include any one of a card number, a card number, and an expiration date. The card identifier ID is not limited thereto and may be a smart serial number and a smart chip serial number capable of identify the user, a bank ID, a resident registration number, a name, a telephone number, or other identifiers themselves which may be arbitrarily set by the user.

Herein, the common factor establishes one relationship, and the individual factor s and the card identifier ID establish a plurality of relationships. The card identifier ID is formed based on the individual factor s corresponding to the private key and a public factor e corresponding to the public key.

The terminal 220 generates the encrypted text by using the card identifier. The terminal 220 stores the common factor n. The terminal 220 receives authentication data including the card identifier from the smart chip 210, transmits the authentication data to the server 230, and receives authentication information on the smart chip 210 from the server 230 when the server 230 authenticates the smart chip 210 by using the authentication key generated from the authentication data.

The authentication data means data constituted by required elements for authenticating the smart chip 210. The authentication data may include an encrypted text C generated in the terminal 220, a decrypted text S generated in the smart chip 210, or the card identifier ID, but is not limited thereto.

Figure 3:
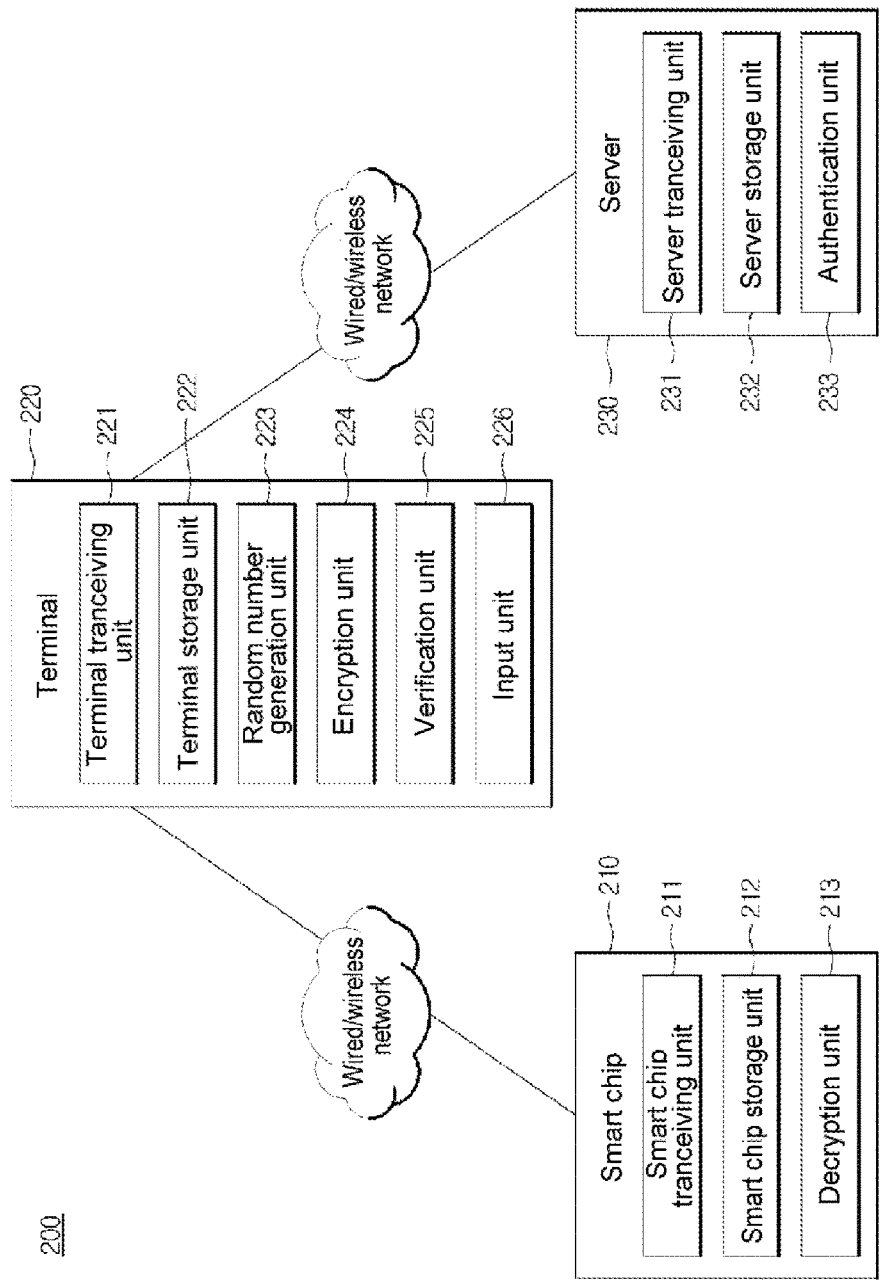
FIG. 3 is a view illustrating a configuration diagram of the system of authenticating the smart chip according to the exemplary embodiment of the present invention.

FIG. 3 is a view illustrating a configuration diagram of the system of authenticating the smart chip according to the exemplary embodiment of the present invention.

Referring to FIG. 3, the smart chip 210 includes a smart chip transceiving unit 211, a smart chip storage unit 212, and a decryption unit 213.

The smart chip transceiving unit 211 transmits or receives the data to or from the terminal 220 through a network. The smart chip transceiving unit 211 is connected with an antenna provided in a smart card or a smart medium installing the smart chip 210 to transmit and receive various information or data to and from the terminal 220.

The card identifier ID and the private key and the common factor n induced from the card identifier ID are stored in the smart chip storage unit 212. Preferably, in the smart chip storage unit 212, a smart chip serial number of the smart chip 210 corresponding to the card identifier ID and a private key induced from the smart chip serial number may be stored.

The decryption unit 213 decrypts the encrypted text C received through the smart chip transceiving unit 211 from the terminal 220 by using the private key stored in a storage unit 233 as a decryption key value according to the request of the terminal 220 to generate the decrypted text S. The decryption unit 213 transmits the decrypted text S to the terminal 220 through the smart chip transceiving unit 211. Preferably, the decryption unit 213 receives the decrypted text C generated by using the card identifier ID, decrypts the encrypted text C to generate the decrypted text S, and transmits the decrypted text to the terminal 220.

Herein, a decryption algorithm through the decryption unit 213 may be implemented by a general public key-based algorithm constituted to make a pair with an encryption algorithm through an encryption unit 224.

The terminal 220 includes a terminal transceiving unit 221, a terminal storage unit 222, a random number generation unit 223, an encryption unit 224, and a verification unit 225.

The smart chip transceiving unit 221 transmits or receives the data to or from the terminal 210 through a network. The terminal transceiving unit 221 transmits or receives the data to or from a server 230 through the network.

In the terminal storage unit 222, the common factor n and the public key induced from the card identifier ID are stored. Preferably, in the terminal storage unit 222, the public key induced from the smart chip serial number corresponding to the card identifier ID and the encrypted text C generated from the public key may be stored.

The random number generation unit 223 generates a random number M. Herein, a method of generating the random number M may use at least one of various methods of generating the random number in the related art.

The encryption unit 224 generates the public key e by using the smart chip serial number received from the terminal transceiving unit 221, that is, the card identifier ID, and encrypts the random number M generated from the random number generation unit 223 by using the public key e as a encryption key value. Herein, an encryption algorithm of the encryption unit 224 makes a pair with the decryption algorithm of the smart chip 210 and may be implemented by the general public key-based algorithm.

The verification unit 225 may perform the authentication performed by the server 230. When the terminal 220 does not transmit the authentication data including the card identifier ID, the encrypted text C, and the decrypted text S to the server 230, the verification unit 225 performs the authentication operation instead.

An input unit 226 may receive the card identifier ID from the outside. The terminal 220 receives or reads the card identifier ID from the smart chip 210 through the terminal transceiving unit 221, but may receive the card identifier ID from a smart phone or a card terminal by the user. This will be described below.

The server 230 includes a server transceiving unit 231, a server storage unit 232, and an authentication unit 233.

The server transceiving unit 231 transmits or receives the data to or from the terminal 220 through the network. The server transceiving unit 231 receives authentication data including the encrypted text C, the decrypted text S, and the card identifier ID from the terminal 220.

In the server storage unit 232, the common factor n is stored. The server storage unit 232 stores the authentication data received from the server transceiving unit 231. Preferably, the server storage unit 232 stores a smart chip serial number corresponding to the card identifier ID, and the encrypted text and the decrypted text which are generated from the public key and the private key induced from the smart chip serial number, respectively.

The authentication unit 233 generates the authentication key from the authentication data. The authentication unit 233 generates an authentication key u required for the authentication by using the received card identifier ID. Preferably, the authentication unit 233 generates the authentication key by using the card identifier ID included in the authentication data and a hash function.

The authentication unit 233 performs the authentication by using the encrypted text C, the decrypted text S, the common factor n, and the authentication key u. The authentication of the authentication unit 233 is a method for authenticating the decrypted text S. The authentication of the decrypted text S may use a method of determining whether the decrypted text S is directly compared with the random number M to coincide with each other. Further, the authentication of the decrypted text S may use a method which is indicated by the public key-based algorithm applied to the present invention by using the encrypted text C, the decrypted text S, and the random number M as input factors.

For example, when the public key-based algorithm is IBE from Weil Pairing (D. Bon degree-M. Frankin, 2001), a method of directly comparing the decrypted text S and the random number M may be applied. When the public key-based algorithm is mediated RSA (D. Boneh-X. Ding-G. Tsudik, 2002), a method of verifying whether a value obtained by mathematically calculating the decrypted text S and the encrypted text C coincides with the random number M may be applied.

In the exemplary embodiment of the present invention, all or some of the respective constituent elements may be implemented in program or application forms.

Figure 4:
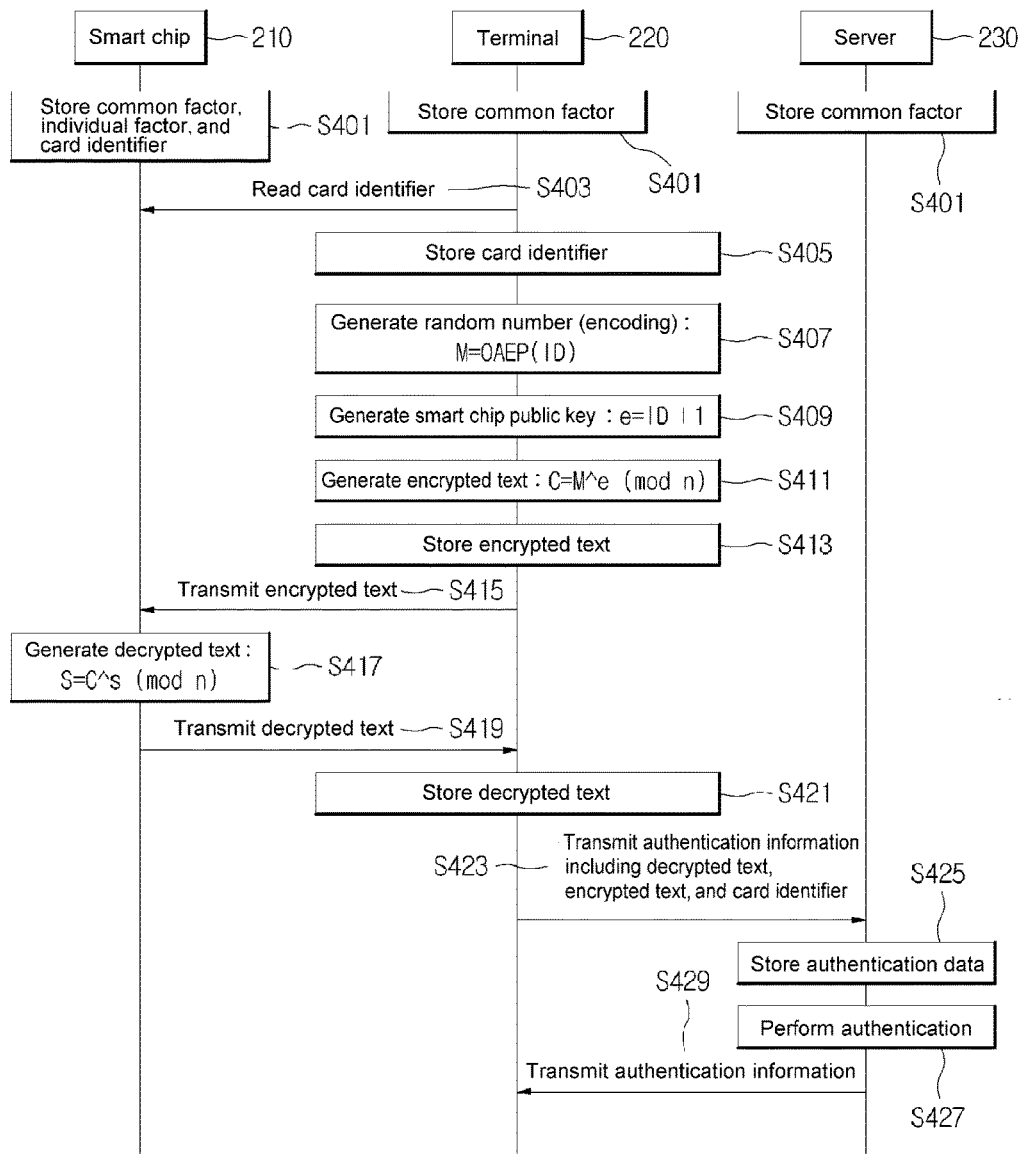
FIG. 4 is a view illustrating an overall flowchart of the system of authenticating the smart chip according to the exemplary embodiment of the present invention.

FIG. 4 is a view illustrating an overall flowchart of the system of authenticating the smart chip according to the exemplary embodiment of the present invention.

Referring to FIG. 4, a flow of a method in which the system 200 of authenticating the smart chip authenticates the smart chip is illustrated.

In step S401, the common factor n, the individual factor s, and the card identifier ID are stored in the smart chip storage unit 212, and the common factor n which is commonly used in all of the smart cards is stored even in the terminal storage unit 222 and the server 230.

In step S403, the terminal transceiving unit 221 reads the card identifier ID from the smart chip 210. When the terminal transceiving unit 221 sends card identifier ID request data, the smart chip transceiving unit 211 calls the card identifier ID stored in the smart chip storage unit 212 to transmit the called card identifier ID to the terminal transceiving unit 221.

In step S405, the terminal storage unit 222 stores the card identifier ID transmitted from the smart chip 210.

In step S407, the random number generation unit 223 of the terminal 220 generates the random number by using the card identifier ID. The random number generation unit 223 encodes the random number by applying the card identifier ID to an optimal asymmetric encryption padding (OAEP) algorithm. The OAEP algorithm is a random numbering method capable of finding an original message in an RSA encryption system.

In step S409, the encryption unit 224 generates the public key e by using the card identifier ID. The encryption unit 224 generates the public key e by e=ID||1 (hereinafter, e is the public key and ID is the card identifier).

In step S411, the encryption unit 224 generates the encrypted text C by using the public key e. The encrypted text C is generated by C=M^e (mod n) (herein, C is the encrypted text, M is the random number, and e is the public key).

In step S413, the encrypted text C is stored in the terminal storage unit 222.

In step S415, the terminal transceiving unit 221 reads the encrypted text C stored in the storage unit 233 for decryption to transmit the encrypted text C to the smart chip 210.

In step S417, the decryption unit 213 decrypts the encrypted text C by using the individual factor s corresponding to the private key and the common factor n to generate the decrypted text S. The decryption unit 213 generates the decrypted text S by S=C^s (mod n).

In step S419, the smart chip transceiving unit 211 transmits the decrypted text S to the terminal transceiving unit 221.

In step S421, the terminal transceiving unit 221 receives the decrypted text S and the decrypted text S is stored in the terminal storage unit 222.

In step S423, the terminal transceiving unit 221 reads the authentication data including the stored decrypted text S, encrypted text C, and card identifier ID to transmit the authentication data to the server transceiving unit 231.

In step S425, the server transceiving unit 231 receives the authentication data and the authentication data is stored in the server storage unit 232.

In step S427, the authentication unit 233 of the server 230 has the authentication data and performs the authentication.

In step S429, the authentication unit 233 of the server 230 completes the authentication process and generates authentication information including the authentication, and the server transceiving unit 231 transmits the authentication information to the terminal transceiving unit 221.

Figure 5:
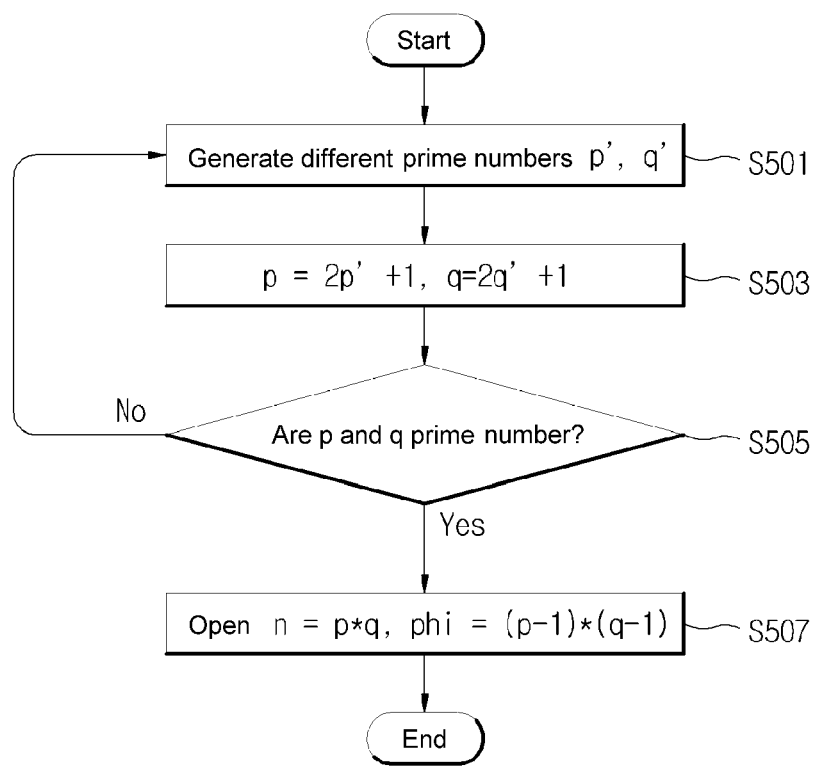
FIG. 5 is a view illustrating a flowchart in which a common factor used in encryption is generated according to the exemplary embodiment of the present invention.

FIG. 5 is a view illustrating a flowchart in which a common factor used in encryption is generated according to the exemplary embodiment of the present invention.

Referring to FIG. 5, a flow of a method of generating the common factor n stored in the smart chip 210, the terminal 220, and the server 230 is illustrated. The generating of the common factor n is one of issue processes, and the issue processes include generating an encryption parameter including the common factor n and issuing a card of the encryption parameter. The issue processes are not the gist of the present invention, but are described for helping in understanding the entire process.

In step S501, initial factors p' and q' as different prime numbers are generated.

In step S503, medium factors p and q are generated from the initial factors p' and q', and a relationship between the initial factors p' and q' and the medium factors p and q is formed as a relationship of p=2p'+1 and q=2q'+1.

In step S505, it is determined whether the medium factors p and q are the prime numbers, and if not, the initial factors p' and q' which are different prime numbers are generated again.

In step S507, if the medium factors p and q are the prime numbers, the common factor n and a private key generation factor phi is generated and opened. The common factor n is n=p*q, and the private key generation factor phi has a relationship of phi=(p−1)*(q−1).

Thereafter, after the common factor n and the private key generation factor phi are generated, the initial factors p' and q' and the medium factors p and q are deleted.

Figure 6:
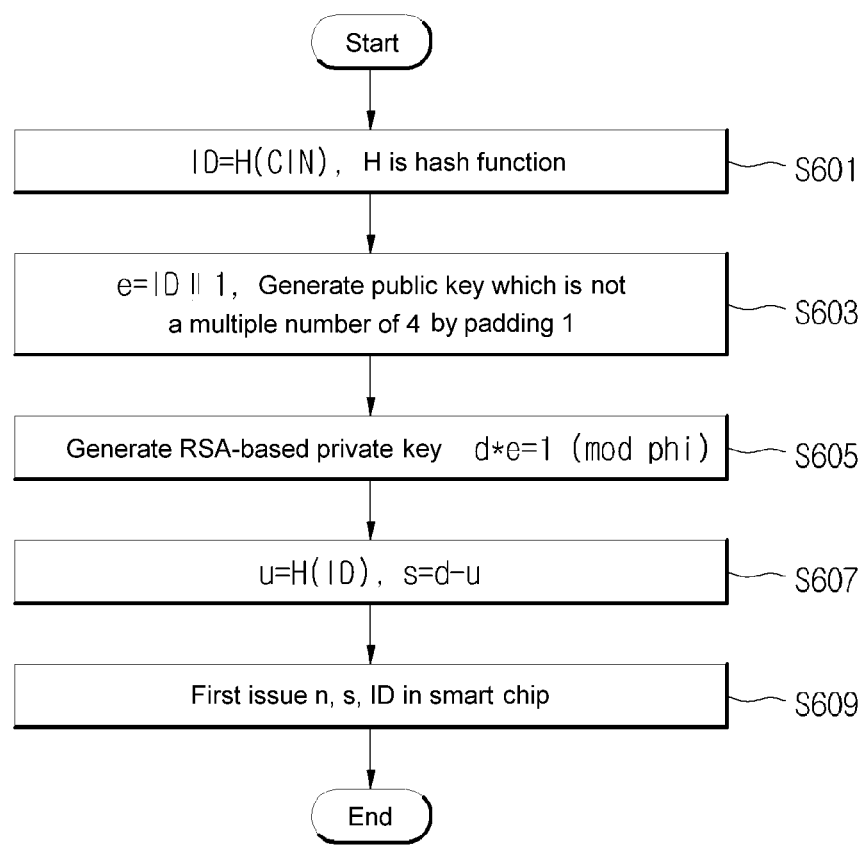
FIG. 6 is a view illustrating a flowchart in which an encryption parameter is issued with a card according to the exemplary embodiment of the present invention.

FIG. 6 is a view illustrating a flowchart in which an encryption parameter is issued with a card according to the exemplary embodiment of the present invention.

Referring to FIG. 6, a flow in which the individual factor s included in the encryption parameter and the card identifier ID are issued to be stored in the card is illustrated.

In step S601, the card identifier ID is generated through a card identification number CIN and a hash function H. The card identifier ID and the card identification number CIN have a relationship of ID=H(CIN). Herein, the card identification number CIN may include a card number, a card number and an expiration period, a smart chip serial number and a smart chip unique number, and the like. Further, according to a type of transaction, when the smart card may represent the user, a banking ID or a resident registration number may be used as the card identification number CIN.

In step S603, the card identifier ID is used and the public key e is generated. The public key e has a relationship of e=ID||1 with the card identifier ID. The public key e may be not a multiple of 4 by padding 1.

In step S605, the public key e and the private key generation factor phi are used to generate a private key d. The private key d has a relationship of d*e=1 (mod phi). Herein, the private key d is a RSA-based private key.

In step S607, a verification key u is generated from the card identifier ID and the hash function, and the individual factor s is generated from the private key d and the verification key u.

In step S609, the common factor n, the individual factor s, and the card identifier ID are issued in the smart card including the smart chip.

Figure 7:
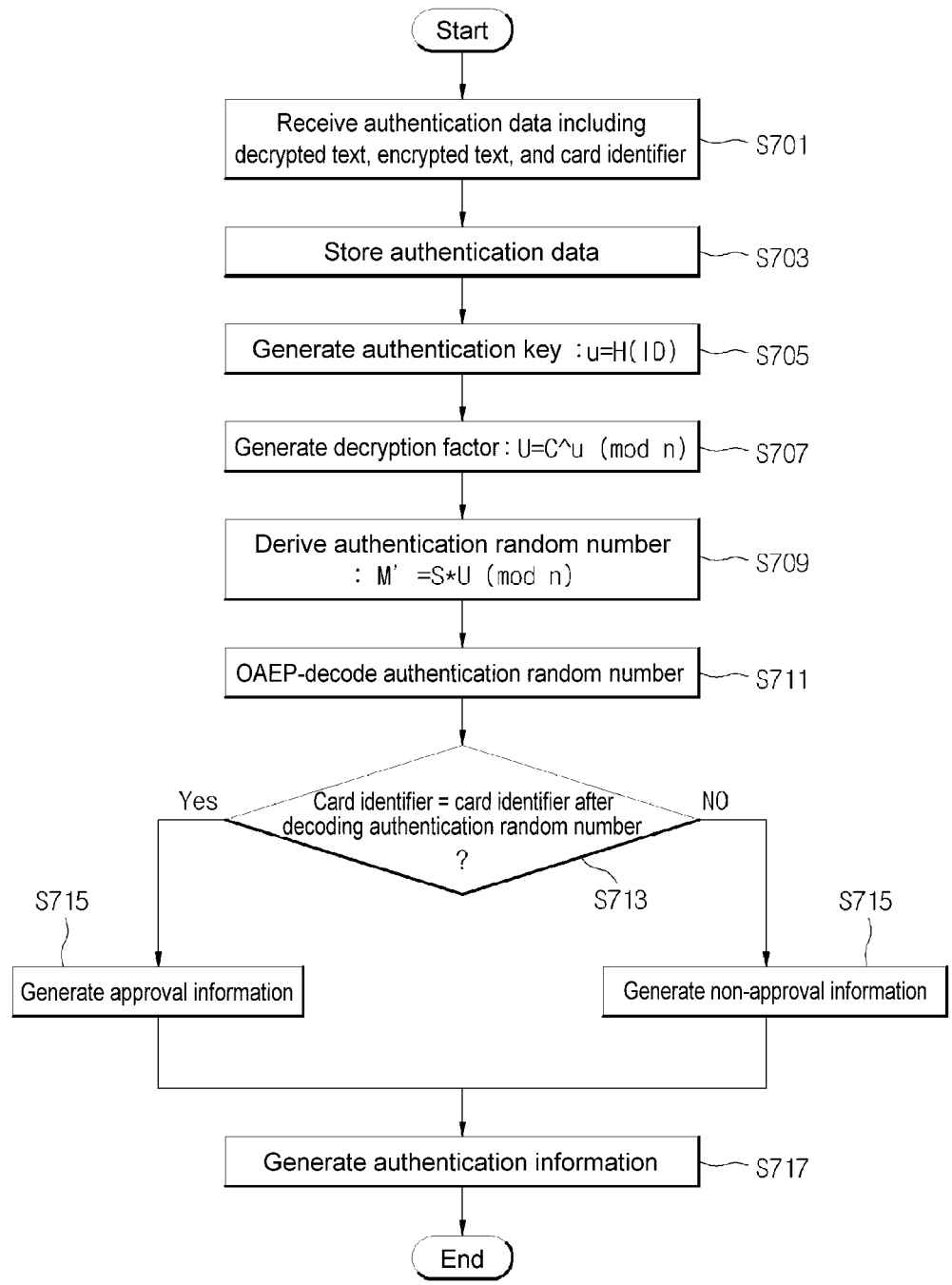
FIG. 7 is a view illustrating an exemplary diagram of interest information according to the exemplary embodiment of the present invention.

FIG. 7 is a view illustrating a flowchart of smart chip authentication of the server according to the exemplary embodiment of the present invention.

Referring to FIG. 7, a flow of the process of authenticating the smart chip in the server is illustrated.

In step S701, the server transceiving unit 231 receives authentication data including the encrypted text C, the decrypted text S, and the card identifier ID from the terminal 220.

In step S703, the authentication data is stored in the server storage unit 232.

In step S705, the authentication unit 233 generates an authentication key u by using the hash function and the card identifier ID. The authentication key u has a relationship of u=H(ID) with the card identifier ID. Herein, an algorithm of generating the authentication key u is equally used in the process of issuing the encryption parameter to the smart card.

In step S707, the authentication unit 233 generates a decryption factor U by using the encrypted text C, the common factor n, and the authentication key u. The decryption factor U is formed as a relationship of $U=C^u \pmod n$.

In step S709, the authentication unit 233 generates an authentication random number M' by applying the decryption factor U and the common factor n to the decrypted text S.

In step S711, the authentication unit 233 OAEP-decrypts the authentication random number M'.

In step S713, the authentication unit 233 compares and determines whether a card identifier after decrypting the authentication random number M' coincides with the card identifier ID stored in the server storage unit 232.

In step S715, the authentication unit 233 generates approval information representing that the smart card including the smart chip is legal when the card identifier after decrypting the authentication random number M' coincides with the card identifier ID and generates non-approval information representing that the smart card including the smart chip is illegal when the card identifier after decrypting the authentication random number M' does not coincide with the card identifier ID.

In step S717, the authentication unit 233 generates authentication information including the approval information and the non-approval information. The server transceiving unit 231 transmits the authentication information to the terminal 220.

Figure 8:
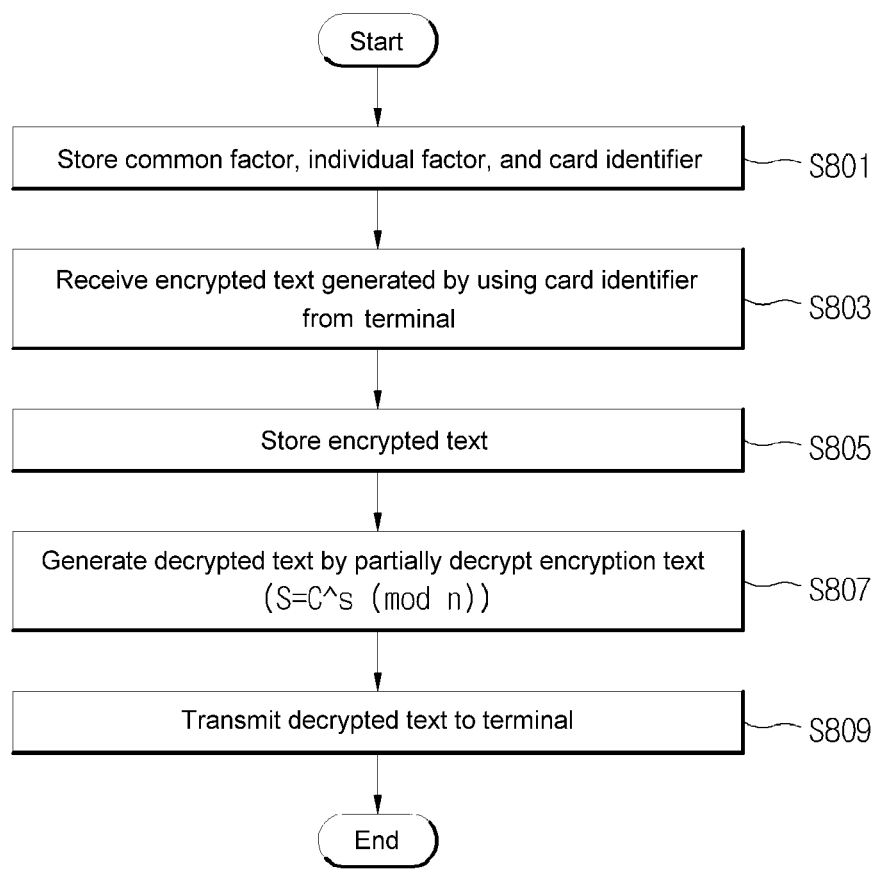
FIG. 8 is a view illustrating a flowchart of smart chip authentication of the smart chip according to the exemplary embodiment of the present invention.

FIG. 8 is a view illustrating a flowchart of smart chip authentication of the smart chip according to the exemplary embodiment of the present invention.

Referring to FIG. 8, a process performed by the smart chip 210 in the system of authenticating the smart chip is illustrated.

In the smart chip storage unit 212, a common factor n, an individual factor s, and a card identifier ID which are initially issued are stored (S801). The smart chip 210 receives the encrypted text C generated by using the card identifier ID from the terminal 220 through the smart chip transceiving unit 211 (S803). The encrypted text C is stored in the smart chip storage unit 212 (S805). The decryption unit 213 partially decrypts the encrypted text C to generate the decrypted text S (S807). The smart chip transceiving unit 211 transmits the decrypted text S to the terminal 220 (S809).

Figure 9:
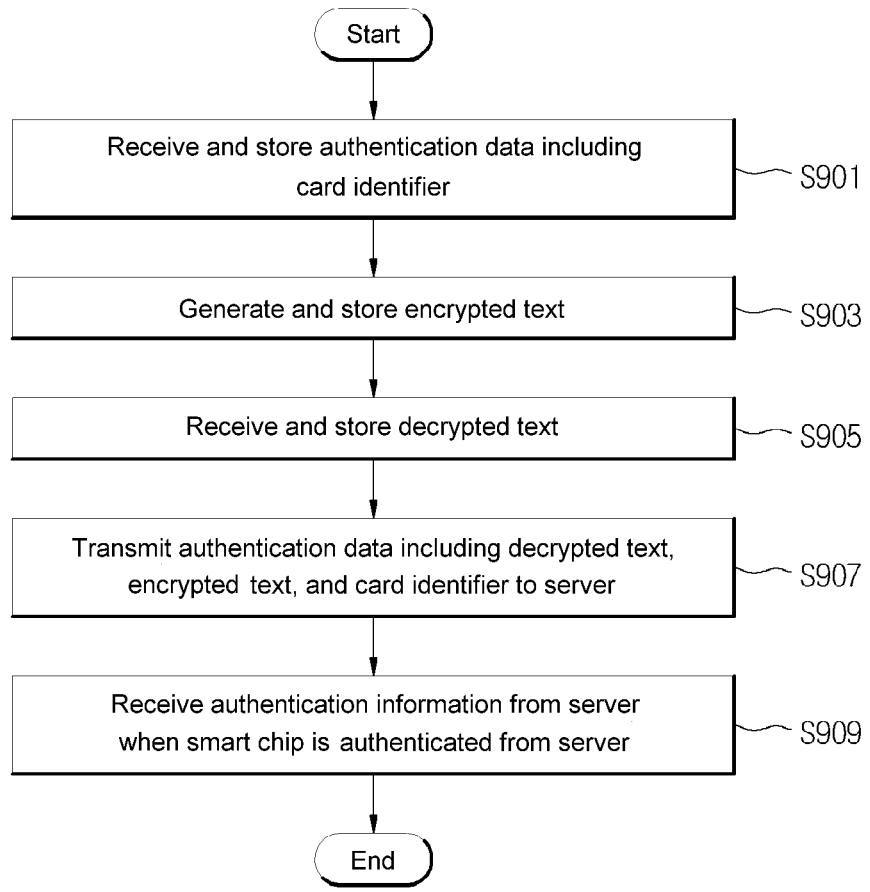
FIG. 9 is a view illustrating a flowchart of smart chip authentication of the terminal according to the exemplary embodiment of the present invention.

FIG. 9 is a view illustrating a flowchart of smart chip authentication of the terminal according to the exemplary embodiment of the present invention.

Referring to FIG. 9, a process performed by the terminal 220 in the system of authenticating the smart chip is illustrated.

The terminal transceiving unit 221 receives authentication data including the encrypted text C, the decrypted text S, and the card identifier ID from the smart chip 210 and the authentication data is stored in the terminal storage unit 222 (S901). The encryption unit 224 generates the encrypted text C and the encrypted text C is stored in the terminal storage unit 222 (S903). The encrypted text C is transmitted to the smart chip 210, the terminal transceiving unit 221 receives the decrypted text S generated by the encrypted text C, and the decrypted text S is stored in the terminal storage unit 222 (S905). The terminal transceiving unit 221 transmits the authentication data to the server 230 (S907). The terminal transceiving unit 221 receives the authentication information from the server 230 when the server 230 authenticates the smart chip 210 (S909).

FIG. 10 is a view illustrating an exemplary diagram of a table verifying an authentication method according to the exemplary embodiment of the present invention.

Referring to FIG. 10, after the smart chip 210 having a common factor n, an individual factor s1, and a card identifier ID1 is authenticated, a table showing that the smart chip 210 may not be authenticated by ID2, not ID1 is illustrated.

The data transmitted from the terminal 220 to the server 230 means the authentication data, and the authentication data is expressed by the number of cases where the public key e, the individual factor s, and the card identifier ID are various. Referring to the server authentication result of the table, only when the individual factor s except for the common factor n and the card identifier ID are the same as each other, the individual factor s except for the common factor n and the card identifier ID may receive the authentication by a legal smart chip (smart card), and when the individual factor s except for the common factor n and the card identifier ID are not things for the same smart card, the individual factor s except for the common factor n and the card identifier ID do not receive the authentication.

Accordingly, the present invention for the smart chip authentication has an advantage of authenticating whether a smart card (smart chip) holding the legal card identifier ID is present without a procedure of retrieving or storing a value other than the common factor n for the authentication in the server 230.

Figure 11:
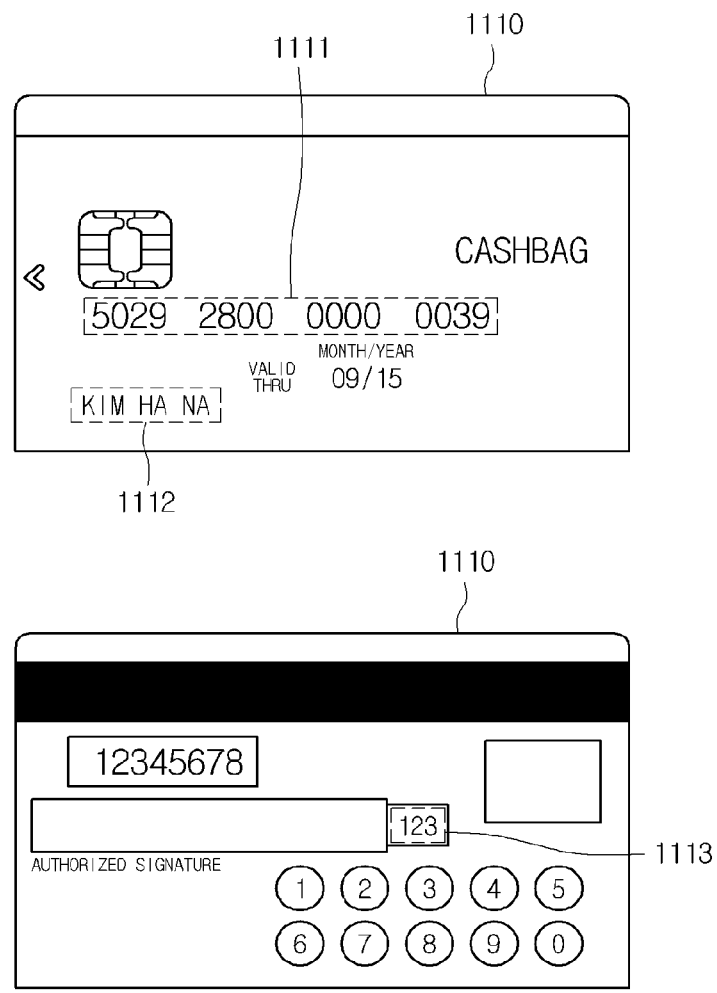
FIG. 11 is a view illustrating an exemplary diagram of a card identifier according to the exemplary embodiment of the present invention.

FIG. 11 is a view illustrating an exemplary diagram of a card identifier according to the exemplary embodiment of the present invention.

Referring to FIG. 11, an example which may be used as the card identifier is illustrated. The card identifier ID may be at least one of letters, numbers and symbols representing who the user is. When the smart chip is used in a credit card 1110, the card identifier ID may be at least one of a serial number 1111 of the credit card, a credit card owner's name 1112, a CVS number 1113 on the back of the credit card. The card identifier ID of the credit card 1110 may be directly recognized by the user outside. The existing public key is stored in the smart chip 210 or the terminal 220 and may not be directly recognized outside, but in the present invention, the authentication is performed by using the card identifier ID recognized outside as the public key.

Figure 12:
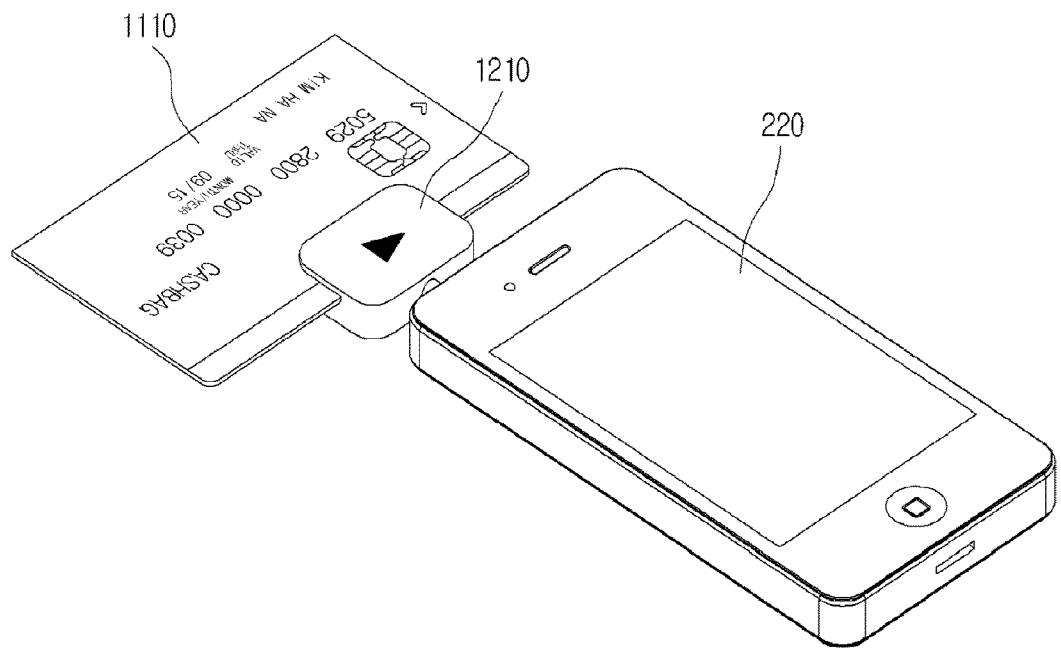
FIG. 12 is a view illustrating an exemplary embodiment of a data transmission scheme between the smart chip and the terminal according to the exemplary embodiment of the present invention.

FIG. 12 is a view illustrating an exemplary embodiment of a data transmission scheme between the smart chip and the terminal according to the exemplary embodiment of the present invention.

Referring to FIG. 12, an example in which the smart chip 210 and the terminal 220 transmit and receive data to or from each other is illustrated. A data transmission method of the smart chip 210 and the terminal 220 may be direct connection using a connector as well as a wired/wireless network. FIG. 12 illustrates an example of the data transmission method between the credit card 1110 and the terminal 220 illustrated as the smart phone. The credit card 1110 and the terminal 220 transmit and receive the card identifier ID, the encrypted text C, the decrypted text S, and other data to the terminal 220 by using a connector 1210. The terminal 220 receives the data from the credit card 1110 to transmit the data to the server 230 for authentication. Herein, it is preferred that the transmission and reception method to the server 230 uses the wired/wireless network.

Figure 13:
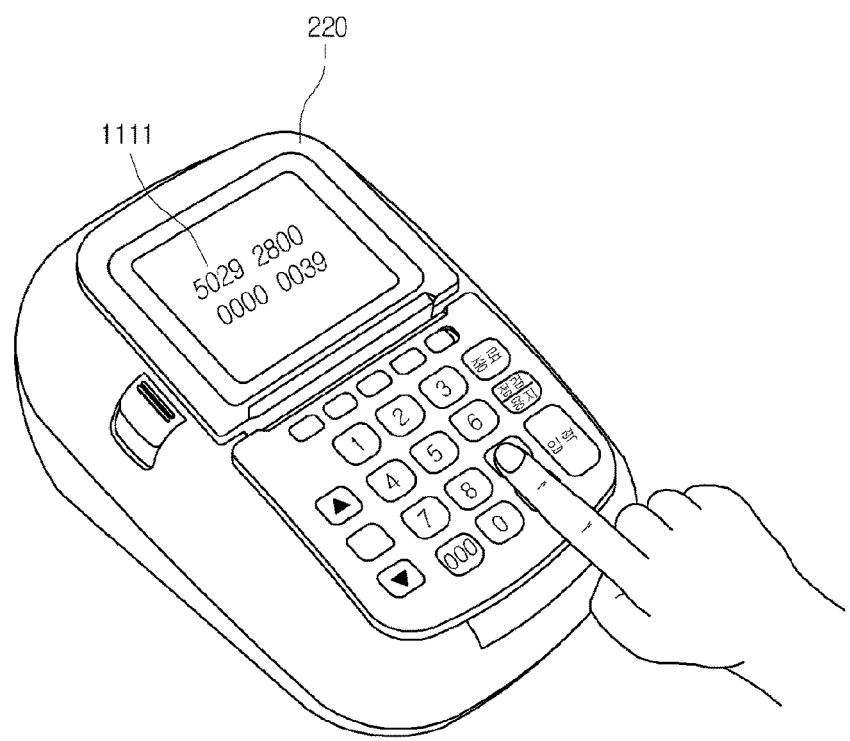
FIG. 13 is a view illustrating an exemplary diagram of a method of receiving the card identifier in the terminal according to the exemplary embodiment of the present invention.

FIG. 13 is a view illustrating an exemplary diagram of a method of receiving the card identifier in the terminal according to the exemplary embodiment of the present invention.

Referring to FIG. 13, an example in which the terminal 220 directly receives the card identifier ID from the user is illustrated. In principle, the terminal 220 reads or receives the card identifier ID from the smart chip 210 (alternatively, the smart card including the smart chip).

Further, the terminal 220 may directly receive the card identifier ID from the outside. The terminal 220 receives the credit card serial number 1111 from the input unit 226 by the user to display the credit card serial number 1111 on the screen. The terminal 220 performs the step of FIG. 9 by generating the encrypted text by using the credit card serial number 1111 as the card identifier ID. When the terminal 220 receives the card identifier ID from the outside, the flow of the system 200 of authenticating the smart chip of FIG. 4 includes receiving the card identifier ID, instead of the reading (S403) of the card identifier ID.

The present invention has been described with reference to the preferred embodiments. However, it will be appreciated by those skilled in the art that various modifications and changes of the present invention can be made without departing from the spirit and the scope of the present invention which are defined in the appended claims and their equivalents.

What is claimed is:

1. A server for authenticating a smart chip, which is connected to a terminal transmitting and receiving data to and from the smart chip through a network, the server comprising:
    a server transceiving unit configured to receive a card identifier identifying a user, an encrypted text, and a decrypted text from the terminal; and
    an authentication unit configured to generate an authentication key from the card identifier and to determine whether the decrypted text is generated from the received card identifier by using the authentication key as a medium to authenticate the smart chip,
    wherein the terminal encrypts the card identifier to generate the encrypted text, the smart chip receives the encrypted text to generate the decrypted text from a private key and transmits the decrypted text to the terminal, and the card identifier is a public key corresponding to the private key.

2. The server for authenticating the smart chip of claim 1, wherein the server transceiving unit transmits authentication information of the authenticated smart chip to the terminal.

3. The server for authenticating the smart chip of claim 1, wherein the card identifier has a form which is open and recognizable from outside.

4. The server for authenticating the smart chip of claim 1, further comprising:
    a server storage unit configured to store a common factor, wherein the authentication is performed by generating a decryption factor based on the common factor and the authentication key.

5. The server for authenticating the smart chip of claim 4, wherein the authentication is performed by generating a random number based on the decryption factor and the common factor.

6. The server for authenticating the smart chip of claim 5, wherein the authentication is performed by decrypting the random number.

7. The server for authenticating the smart chip of claim 6, wherein the authentication is performed by determining whether the card identifier coincides with a decryption value of the random number.

8. The server for authenticating the smart chip of claim 7, wherein the smart chip is authenticated to be valid when the card identifier coincides with the decryption value of the random number.

9. A smart chip which transmits and receives data to and from a terminal connected to a server through a network, the smart chip comprising:
    a smart chip storage unit configured to store a private key and a card identifier identifying a user;
    a decryption unit configured to decrypt an encrypted text generated in and received from the terminal with the private key to generate a decrypted text; and
    a smart chip transceiving unit configured to transmit the card identifier and the decrypted text to the terminal and to receive the encrypted text from the terminal,
    wherein the terminal encrypts the card identifier to generate the encrypted text, the server receives the card identifier, the encrypted text, and the decrypted text from the terminal, generates an authentication key from the card identifier, and authenticates the smart chip by determining whether the decrypted text is generated from the received card identifier by using the authentication key as a medium, and the card identifier is a public key corresponding to the private key.

10. The smart chip of claim 9, wherein the card identifier has a form which is open and recognizable from outside.

11. The smart chip of claim 9, wherein a common factor is stored in the smart chip storage unit, and the authentication is performed by generating a decryption factor based on the common factor and the authentication key.

12. The smart chip of claim 11, wherein the authentication is performed by generating a random number based on the decryption factor and the common factor.

13. The smart chip of claim 12, wherein the authentication is performed by decrypting the random number.

14. The smart chip of claim 13, wherein the authentication is performed by determining whether the card identifier coincides with a decryption value of the random number.

15. The smart chip of claim 14, wherein the smart chip is authenticated to be valid when the card identifier coincides with the decryption value of the random number.

16. A terminal for authenticating a smart chip, which transmits and receives data to and from the smart chip and is connected to a server through a network, the terminal comprising:

a terminal transceiving unit configured to receive a card identifier and a decrypted text from the smart chip; and an encryption unit configured to encrypt the card identifier to generate an encrypted text, wherein the terminal transceiving unit transmits the card identifier, the encrypted text, and the decrypted text to the server, the server receives the card identifier, the encrypted text, and the decrypted text from the terminal, generates an authentication key from the card identifier, and determines whether the decrypted text is generated from the received card identifier by using the authentication key as a medium, and the smart chip generates the decrypted text from a private key by receiving the encrypted text, and the card identifier is a public key corresponding to the private key.

17. The terminal for authenticating the smart chip of claim 16, wherein the card identifier has a form which is open and recognizable from outside.

18. The terminal for authenticating the smart chip of claim 16, wherein a common factor is stored in a terminal storage unit, and the authentication is performed by generating a decryption factor based on the common factor and the authentication key.

19. The terminal for authenticating the smart chip of claim 18, wherein the authentication is performed by generating a random number based on the decryption factor and the common factor.

20. The terminal for authenticating the smart chip of claim 19, wherein the authentication is performed by decrypting the random number.

* * * * *